United States Patent
Harashima

[11] Patent Number: 5,907,077
[45] Date of Patent: May 25, 1999

[54] METHOD AND APPARATUS FOR TREATMENT OF FREON GAS

[75] Inventor: Keiichi Harashima, Tokyo, Japan

[73] Assignee: NEC Corporation, Tokyo, Japan

[21] Appl. No.: 08/816,420

[22] Filed: Mar. 14, 1997

[30] Foreign Application Priority Data

Mar. 18, 1996 [JP] Japan ..................................... 8-061156

[51] Int. Cl.⁶ .............................. A62D 3/00; B01D 53/70
[52] U.S. Cl. ..................... 588/210; 588/212; 423/240 R; 423/240 S
[58] Field of Search ..................... 588/210, 212; 423/240 R, 240 S; 204/157.44, 157.48

[56] References Cited

U.S. PATENT DOCUMENTS

| | | | |
|---|---|---|---|
| 4,479,443 | 10/1984 | Faldt et al. ............................... | 588/210 |
| 5,118,492 | 6/1992 | Okazaki et al. ......................... | 423/481 |
| 5,138,959 | 8/1992 | Kulkarni ................................. | 588/212 |
| 5,187,344 | 2/1993 | Mizuno et al. .......................... | 588/210 |
| 5,498,826 | 3/1996 | Dummersdorf et al. ............... | 588/212 |
| 5,569,810 | 10/1996 | Tsuji ....................................... | 588/212 |
| 5,609,730 | 3/1997 | Yamamoto ............................. | 588/212 |
| 5,637,198 | 6/1997 | Breault ................................... | 588/212 |

FOREIGN PATENT DOCUMENTS

| | | | |
|---|---|---|---|
| 602510 | 6/1994 | European Pat. Off. ............... | 588/212 |
| 4042028 | 7/1992 | Germany ............................... | 588/212 |
| 57-01016 | 12/1982 | Japan . | |
| 4-265113 | 9/1992 | Japan . | |
| 8-24560 | 1/1996 | Japan . | |

*Primary Examiner*—Gary P. Straub
*Attorney, Agent, or Firm*—Young & Thompson

[57] ABSTRACT

A method of treatment of a fleon gas consisting only of carbon and fluorine is provided, wherein the fleon gas is exposed to a plasma to decompose and chemically activate the fleon gas. The fleon gas having been chemically activated is then made into contact with a reactant to form a reaction product.

8 Claims, 2 Drawing Sheets

METHOD AND APPARATUS FOR TREATMENT OF FREON GAS

BACKGROUND OF THE INVENTION

The present invention relates to a method and an apparatus for treatment of exhaust gas having been generated in manufacturing processes for semiconductor devices, and more particularly to a method and an apparatus for treatment of unreacted PFC gas to avoid direct discharge of the unreacted PFC gas to an atmosphere.

In the semiconductor device manufacturing processes, a PFC gas or a freon gas comprising carbon and fluorine has been used. The PFC gas has been used, for example, as an etching gas in the dry etching process or a cleaning gas in the plasma CVD apparatus. The PFC gas is much higher in global warming power coefficient (GWP) by about a few thousands than that of carbon dioxide, for which reason if the used PFC gas is discharged directly to atmosphere, then a certain influence on the global atmospheric system is concerned. It has been required to control the direct discharge of the used PFC gas to the atmosphere.

In the conventional dry etching apparatus, PFC gases such as $CF_4$, $C_2F_6$ are used as etching gases. As illustrated in FIG. 1; a PFC gas is introduced as a source gas into a dry etching apparatus 1 before the PFC gas PFC gas is then decomposed by a radio frequency plasma whereby not only etching species or etchants but also unreacted PFC gas and etching reaction products are generated. The etching species or etchants are used for the dry etching process. On the other hand, the unreacted PFC gas and reaction products are discharged by a pump 2 from a reaction chamber in the dry etching apparatus 1. The discharged unreacted PFC gas and etching reaction products are fed to a removal apparatus 3 for removing the reaction products.

If the $C_2F_6$ gas is used as an etching gas for etching a silicon oxide film, then etching reaction gases such as $SiF_4$, $COF_2$ are generated. In order to remove such undesired etching reaction gases, it is effective to use an adsorption removal method by use of adsorbents such as zeolite or activated carbon for removal thereof. Since, however, the unreacted PFC gas is chemically stable, the unreacted PFC gas is not adsorbed onto the adsorbents such as zeolite or activated carbon, for which reason conventionally the unreacted PFC gas is obliged to be discharged directly.

The plasma etching apparatus used for the manufacturing processes of the semiconductor device has a low decomposition ratio of 20%, for which reason the majority of the introduced PFC gas is discharged as the unreacted PFC gas. As described above, since the unreacted PFC gas is chemically stable, it is difficult to adsorb the unreacted PFC gas onto the adsorbent, for which reason the unreacted PFC gas is directly discharged to the atmosphere without any treatment or any process. The discharge of the unreacted PFC gas raises the serious problem with providing a great deal of influence to the global atmospheric system. In order to prevent this problem, an additional apparatus is required for compulsory treatment of the unreacted PFC gas to avoid direct discharge of the unreacted PFC gas into the atmosphere.

In order to decompose the unreacted PFC gas, it has been proposed to practice a combustion decomposition method, wherein the unreacted PFC gas is heated up to a high temperature of 1000° C.–1200° C. It has been concerned that this heat treatment at such high temperature may raise another serious problem with safety.

In the above circumstances, it has been required to develop a novel method and apparatus for treatment of the unreacted PFC gas to avoid direct discharge thereof to an atmosphere with safety and without substantial influence to a global atmospheric system.

SUMMARY OF THE INVENTION

Accordingly, it is an object of the present invention to provide a novel method for treatment of the unreacted PFC gas to avoid direct discharge thereof to an atmosphere for providing no substantial influence to a global atmospheric system.

It is a further object of the present invention to provide a novel method for treatment of the unreacted PFC gas to avoid direct discharge thereof to an atmosphere with safety.

It is a still further object of the present invention to provide a novel apparatus for treatment of the unreacted PFC gas to avoid direct discharge thereof to an atmosphere for providing no substantial influence to a global atmospheric system.

It is yet a further object of the present invention to provide a novel apparatus for treatment of the unreacted PFC gas to avoid direct discharge thereof to an atmosphere with safety.

It is a further more object of the present invention to provide a novel inexpensive apparatus for treatment of the unreacted PFC gas to avoid direct discharge thereof.

It is moreover object of the present invention to provide a novel simply structured apparatus for treatment of the unreacted PFC gas to avoid direct discharge thereof.

It is another object of the present invention to provide a novel dry etching system provided with an additional apparatus for treatment of the unreacted PFC gas to avoid direct discharge thereof to an atmosphere for providing no substantial influence to a global atmospheric system.

It is still another object of the present invention to provide a novel dry etching system provided with an additional apparatus for treatment of the unreacted PFC gas to avoid direct discharge thereof to an atmosphere with safety.

It is yet another object of the present invention to provide a novel dry etching system provided with an inexpensive apparatus for treatment of the unreacted PFC gas to avoid direct discharge thereof.

It is further another object of the present invention to provide a novel dry etching system provided with an additional simply structured apparatus for treatment of the unreacted PFC gas to avoid direct discharge thereof.

The above and other objects, features and advantages of the present invention will be apparent from the following descriptions.

The present invention provides a method of treatment of a freon gas consisting only of carbon and fluorine, wherein the freon gas is exposed to a plasma to decompose and chemically activate the freon gas. The freon gas having been chemically activated is then made into contact with a reactant to form a reaction product.

The present invention also provides an apparatus for treatment of a freon gas consisting only of carbon and fluorine. The apparatus comprises a reaction chamber, a fleon gas introducing device connected to the reaction chamber for introducing a freon gas into the reaction chamber, and a plasma generator for generating a plasma in the reaction chamber so that the plasma decomposes and chemically activates the freon gas.

BRIEF DESCRIPTIONS OF THE DRAWINGS

Preferred embodiments of the present invention will be described in detail with reference to the accompanying drawings.

DISCLOSURE OF THE INVENTION

Figure 1:
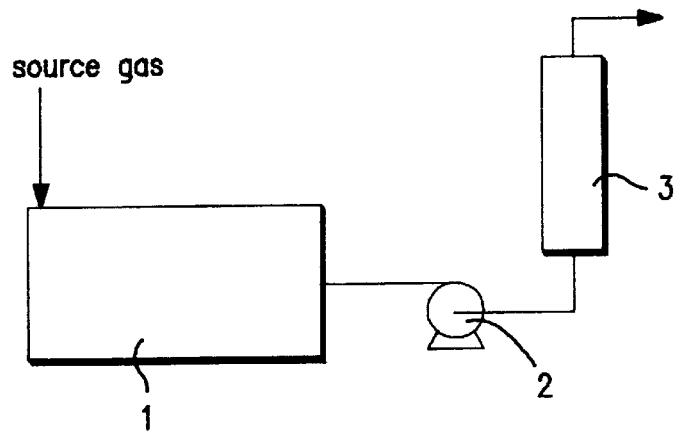
FIG. 1 is a schematic diagram illustrative of the conventional dry etching system.

The present invention provides a method of treatment of a freon gas consisting only of carbon and fluorine, wherein the freon gas is exposed to a plasma to decompose and chemically activate the freon gas.

It is preferable that the freon gas having been chemically activated is then made to contact with a reactant to form a reaction product.

In the above case, it is further preferable that the reaction product is adsorbed by an adsorbent.

It is also preferable that the adsorbent comprises zeolite.

It is also preferable that the reactant comprises a solid silicon.

It is also preferable that the reactant comprises quartz.

It is also preferable that the reactant comprises hydrogen.

It is also preferable that the plasma has a density of about $1 \times 10^{11}$ cm$^{-3}$.

It is also preferable that an internal pressure of the reaction chamber is set at about $1 \times 10^{-3}$ Torr.

It is also preferable that the reactant is placed on a holder which is applied with a high frequency voltage.

It is also preferable that the reaction product is a polymer.

It is also preferable that the reactant is placed on a holder which is cooled to a temperature of not more than $-50°$ C.

In the above case, it is further preferable that a hydrogen gas is further supplied to a reaction chamber, in which the freon gas is reacted with the reactant, at a flow rate which is not less than 70% of a flow rate of the freon gas into the reaction chamber.

The present invention also provides an apparatus for treatment of a freon gas consisting only of carbon and fluorine. The apparatus comprises a reaction chamber, a freon gas introducing device connected to the reaction chamber for introducing a freon gas into the reaction chamber, and a plasma generator for generating a plasma in the reaction chamber so that the plasma decomposes and chemically activates the freon gas.

It is possible to further provide a holder in the chamber for holding a reactant which is chemically reacted with the freon gas, which has been chemically activated, to form a reaction product.

It is possible to further provide a high frequency power source electrically connected to the holder for applying a high frequency voltage to the holder.

It is possible to further provide a hydrogen gas introduction device connected to the reaction chamber for introducing a hydrogen gas into the reaction chamber to cause a reaction of hydrogen with fluorine in the freon gas to form hydrogen fluoride.

It is possible to further provide a reaction gas introduction device connected to the reaction chamber for introducing a reaction gas which is chemically reacted with the freon gas having been chemically activated to form a polymer.

It is possible to further provide a holder provided in the reaction chamber for holding a deposition of the polymer.

It is possible to further provide a circulator connected to the holder for cooling the holder.

PREFERRED EMBODIMENTS

Preferred embodiments according to the present invention will be described in detail with reference to FIGS. 2 and 3, wherein a novel dry etching system is provided, which has an additional apparatus for treatment of the unreacted PFC gas to avoid direct discharge thereof to an atmosphere. The unreacted PFC gas is decomposed by a plasma whereby the PFC gas is chemically activated. This chemically activated PFC gas is then made into contact with a chemical reactant to cause a chemical reaction of the activated PFC gas with the chemical reactant so that the PFC gas is acquired as a reaction product. A solid silicon, quartz and hydrogen gas are available as the chemical reactant.

The structure of the novel apparatus for treatment of the unreacted PFC gas to avoid direct discharge thereof to an atmosphere will subsequently be described. The novel apparatus comprises a plasma treatment chamber and an acquiring section. The plasma treatment chamber generates a plasma by which an unreacted PFC gas having been introduced thereinto is decomposed to be chemically activated. The acquiring section is provided in the plasma treatment chamber for causing a chemical reaction of the chemically activated PFC gas with a chemical reactant so that the PFC gas is acquired as a reaction product. The novel apparatus has a bias voltage supply for applying a bias voltage to a holder which holds the chemical reactant so that ionized PFC gas are attracted to the chemical reactant for increase in the reaction efficiency.

Alternatively, the novel apparatus comprises a plasma treatment chamber and an acquiring gas supply section. The plasma treatment chamber generates a plasma by which an unreacted PFC gas having been introduced thereinto is decomposed to be chemically activated. The acquiring gas supply section is provided for supplying an acquiring gas into the plasma treatment chamber for causing a chemical reaction of the chemically activated PFC gas with the acquiring gas so that the PFC gas is polymerized with the acquiring gas to form polymers. The novel apparatus has an acquiring section which is provided with a holder cooled for promotion of adsorption of radical to improve an efficiency of a polymer formation.

Figure 2:
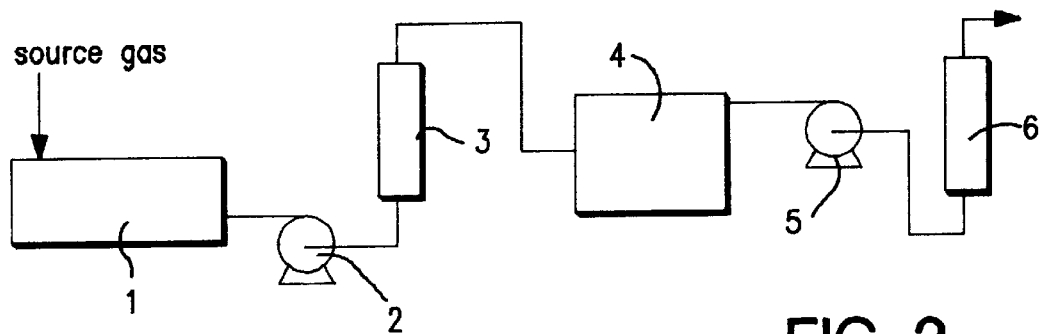
FIG. 2 is a schematic diagram illustrative of a novel dry etching system provided with an additional apparatus for treatment of the unreacted PFC gas to avoid direct discharge thereof to an atmosphere in accordance with the present invention.
Figure 3:
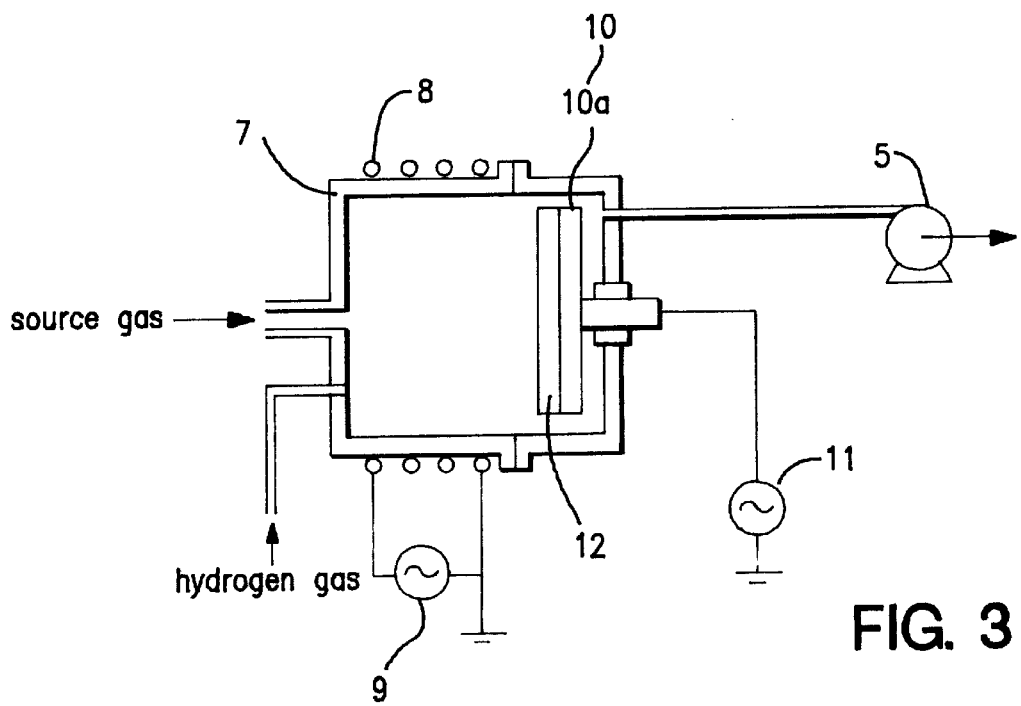
FIG. 3 is a schematic diagram illustrative of an apparatus for treatment of the unreacted PFC gas to avoid direct discharge thereof to an atmosphere in a first embodiment according to the present invention.

FIG. 2 is illustrative of an exhaust gas treatment apparatus of a first embodiment according to the present invention. PFC gas is introduced as a source gas into a dry etching apparatus 1 for etching a semiconductor substrate. An exhaust gas includes reaction products such as SiF$_4$ and the like and unreacted PFC gas. The exhaust gas is exhausted by a pump 2 and fed to an adsorption tower 3 for removal of the reaction products such as SiF$_4$. The unreacted PFC gas is not removed. The unreacted PFC gas is then fed into a plasma treatment chamber 4 of an inductive coupled plasma generator for generating a plasma. The inductive coupled plasma generator is illustrated in FIG. 3. The inductive coupled plasma generator has a discharge tube 7. Coils 8 are provided to round the discharge tube 7. A high frequency power source 9 is provided to apply a voltage to the coils 8 at a frequency of 13.56 MHz to cause an inductive electric field in the discharge tube 7 whereby the inductive electric field causes a plasma in the discharge tube 7. The generated plasma has a high density of $1\times10^{11}$ cm$^{-3}$. This high density plasma causes dissociation of 80% of the unreacted PFC gas having been introduced into the plasma treatment chamber 4.

An acquiring section 10 has a holder 10a which is provided in the discharge tube 7 of the plasma treatment chamber. A quartz plate 12 is provided on the holder 10a. The quartz plate 12 serves as a reactant which is to be chemically reacted with the activated PFC gas. As a bias voltage supply, a high frequency power supply 11 is provided for applying a bias voltage to the holder 10a at a frequency of 13.56 MHz.

The unreacted PFC gas having been introduced into the discharge tube 7 of the plasma treatment chamber is decomposed by the plasma into chemically activated species such as CFx ion, CFz radical and F radical and the like. Those chemically activated species are chemically reacted with the quartz plate 12 to form reaction products. A hydrogen gas is also introduced into the discharge tube 7 so that fluorine acting as one of the activated species generated of the PFC gas is reacted with the introduced hydrogen gas to form HF. A bias voltage is applied to the holder 10a by the high frequency power supply 11 to have the ions attracted to the quartz plate 12 in improve the reaction efficiency.

The above activated species are reacted with quartz to form products such as $SiF_4$ and $COF_2$ and the like so that the unreacted PFC gas is acquired into the reaction products. Those reaction products are exhausted from the plasma treatment chamber by a pump 5 and fed into an adsorption tower 6 which has been filled with zeolite whereby the reaction products are adsorbed into zeolite before the zeolite is adsorbed with the reaction products are removed.

For example, it is preferable that a closing power of the high frequency power supply 9 for generation of the plasma is set at 3000 W. A bias high frequency power supply for applying high frequency power to the holder 10a is set at 500 W. A volume of the plasma treatment chamber is preferably not less than 20 liters and more preferably 50 liters or more for allowing the gas residing for a long time to obtain an increased dissociation efficiency.

An internal pressure of the plasma treatment chamber is set at $1\times10^{-3}$ Torr by a butterfly valve to promote decomposition of the gas and subsequent reaction with the reactant whereby 80% of the PFC gas having been introduced is decomposed and subsequently reacted with the reactant to form the reaction products. The reaction products are exhausted. It is, therefore, possible to suppress discharge of the PFC gas into the atmosphere.

As a modification of the above embodiment, it is possible that a solid silicon is placed on the holder 10a to form SiF as a reaction product.

A second embodiment according to the present invention will be described with reference to FIGS. 2 and 4, wherein a novel dry etching system is provided, which has an additional apparatus for treatment of the unreacted PFC gas to avoid direct discharge thereof to an atmosphere. The unreacted PFC gas is decomposed by a plasma whereby the PFC gas is chemically activated. This chemically activated PFC gas is then made into contact with a chemical reactant to cause a chemical reaction of the activated PFC gas with the chemical reactant so that the PFC gas is acquired as a reaction product.

Figure 4:
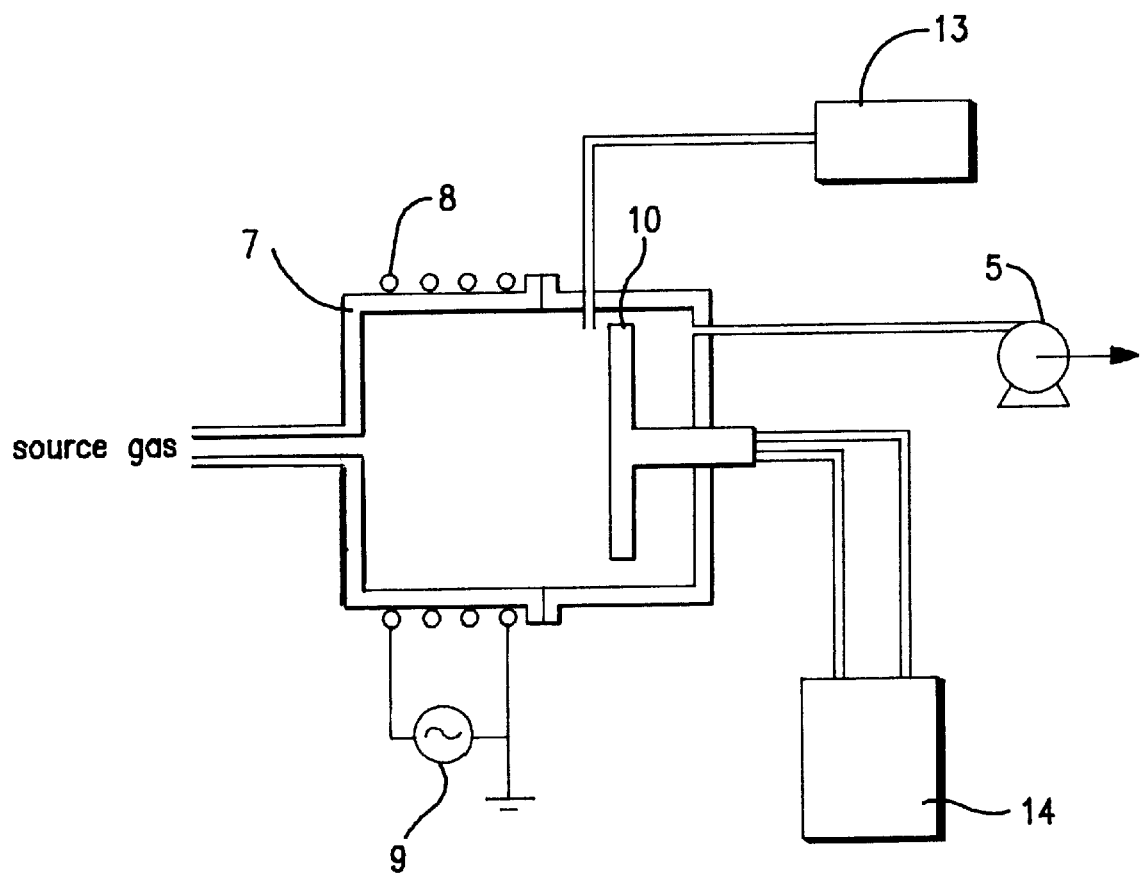
FIG. 4 is a schematic diagram illustrative of an apparatus for treatment of the unreacted PFC gas to avoid direct discharge thereof to an atmosphere in a second embodiment according to the present invention.

FIG. 4 is illustrative of an exhaust gas treatment apparatus of a second embodiment according to the present invention. PFC gas is introduced as a source gas into a dry etching apparatus 1 for etching a semiconductor substrate. An exhaust gas includes reaction products such as $SiF_4$ and the like and unreacted PFC gas. The exhaust gas is exhausted by a pump 2 and fed to an adsorption tower 3 for removal of the reaction products such as $SiF_4$. The unreacted PFC gas is not removed. The unreacted PFC gas is then fed into a plasma treatment chamber 4 of an inductive coupled plasma generator for generating a plasma. The inductive coupled plasma generator is illustrated in FIG. 4. The inductive coupled plasma generator has a discharge tube 7. Coils 8 are provided to round the discharge tube 7. A high frequency power source 9 is provided to apply a voltage to the coils 8 at a frequency of 13.56 MHz to cause an inductive electric field in the discharge tube 7 whereby the inductive electric field causes a plasma in the discharge tube 7. The generated plasma has a high density of $1\times10^{11}$ ions/cm$^3$. This high density plasma causes dissociation of 80% of the unreacted PFC gas having been introduced into the plasma treatment chamber 4. An acquiring gas supply section 13 is provided for a reactant gas into the discharge chamber 7 so that the reactant gas is chemically reacted with the activated PFC gas to form polymers. An acquiring section 10 has a holder 10a which is provided in the discharge tube 7 of the plasma treatment chamber. The holder 10a is cooled for promotion of the adsorption of the radical spaces to thereby improve efficiency of the polymer formation.

The PFC gas having been introduced into the discharge chamber 7 is decomposed by the high density plasma. An hydrogen gas is introduced by the acquiring gas supply section 13 into the discharge tube 7 so that fluorine in the activated species of the PFC gas is reacted with hydrogen gas having been introduced to thereby form HF. For this reason, the amount of fluorine radicals is reduced whilst the amounts of other radicals such as CF and $CF_2$ and the like are increased. CF and $CF_2$ are reacted and polymerized with each other to form polymers. The hydrogen gas is introduced at a flow rate which is not less than 70% of the PFC gas flow rate so that the rate of polymerization exceeds the etching rate of the polymer whereby the polymer is deposited in the discharge tube 7. A circulator 14 is further provided for cooling the holder 10a to promote adsorption of the radical species onto the holder 10a so as to rise the efficiency of the polymer formation. The deposition rate of the polymer onto the holder 10a is increased by drop of a temperature of the holder 10a. As the temperature of the holder 10a becomes lower than $-50°$ C., the deposition rate of the polymer is rapidly increased, in the light of which it is preferable to cool the holder 10a to a temperature of $-50°$ C. The hydrogen fluoride (HF) is fed to the adsorption tower so that the hydrogen fluoride (HF) is adsorbed into the zeolite for removal thereof.

Although in the above first and second embodiments, the inductive coupled plasma generator is used to generate a plasma in the plasma treatment chamber, other plasma generators are also available. It is, for example available that helicon wave is used to generate the plasma. It is also available that a microwave is introduced to apply a magnetic field to the microwave for causing an electron cyclotron resonance by which a high dissociation plasma is generated. It is further available that a plurality of the above novel plasma treatment chambers are provided in parallel to each other to rise the efficiency of the decomposition of the PFC gas.

Whereas modifications of the present invention will be apparent to a person having ordinary skill in the art, to which the invention pertains, it is to be understood that embodiments as shown and described by way of illustrations are by no means intended to be considered in a limiting sense. Accordingly, it is to be intended to cover by claims any modifications of the present invention which fall within the spirit and scope of the present invention.

What is claimed is:

1. A method of treating fluorocarbon gas comprising the steps of:
    (a) providing a reaction chamber for containing said fluorocarbon gas;
    (b) setting the internal pressure of said reaction chamber to about $1 \times 10^{-3}$ Torr;
    (c) creating a plasma having a density of about $1 \times 10^{11}$ ions/cm$^3$;
    (d) exposing said fluorocarbon gas to said plasma to decompose and chemically activate said fluorocarbon gas;
    (e) mounting a solid reactant on a holder within said reaction chamber;
    (f) controlling the flow rate of said fluorocarbon gas; and
    (g) contacting the activated fluorocarbon gas with said solid reactant to form a reaction product bound to said solid reactant,
wherein said solid reactant serves as a first reactant and as an adsorbent for polymeric products formed during the process.

2. The method as claimed in claim 1, wherein said solid reactant comprises silicon.

3. The method as claimed in claim 1, wherein said solid reactant comprises quartz.

4. The method as claimed in claim 1, wherein said reaction product is a polymer.

5. The method of claim 1, comprising the further step of cooling said solid reactant to a temperature of not greater than $-50°$ C.

6. A method of treating fluorocarbon gas comprising the steps of:
    (a) providing a reaction chamber for containing said fluorocarbon gas;
    (b) setting the internal pressure of said reaction chamber to about $1 \times 10^{-3}$ Torr;
    (c) creating a plasma having a density of about $1 \times 10^{11}$ ions/cm$^3$;
    (d) exposing said fluorocarbon gas to said plasma to decompose and chemically activate said fluorocarbon gas;
    (e) mounting a solid reactant on a holder within said reaction chamber and applying a high frequency voltage to said solid reactant;
    (f) controlling the flow rate of said fluorocarbon gas; and
    (g) contacting the activated fluorocarbon gas with said solid reactant to form a reaction product bound to said solid reactant.

7. A method of treating fluorocarbon gas comprising the steps of:
    (a) providing a reaction chamber for containing said fluorocarbon gas;
    (b) setting the internal pressure of said reaction chamber to about $1 \times 10^{-3}$ Torr;
    (c) creating a plasma having a density of about $1 \times 10^{11}$ ions/cm$^3$;
    (d) exposing said fluorocarbon gas to said plasma to decompose and chemically activate said fluorocarbon gas;
    (e) mounting a solid reactant on a holder within said reaction chamber to act as a first reactant;
    (f) controlling the flow rate of said fluorocarbon gas;
    (g) supplying a hydrogen gas to said reaction chamber at a flow rate which not less than 70% of said fluorocarbon gas flow rate, said hydrogen gas acting as a second reactant; and
    (h) contacting the activated fluorocarbon gas with said solid reactant to form a reaction product bound to said solid reactant,
wherein said solid reactant serves as a first reactant and as an adsorbent for polymeric products formed during the process.

8. The method of claim 7, comprising the further step of cooling said solid reactant to a temperature of not greater than $-50°$ C.

* * * * *